(12) United States Patent
Kim et al.

(10) Patent No.: US 9,294,327 B2
(45) Date of Patent: Mar. 22, 2016

(54) METHOD FOR IDENTIFYING OFDM COMMUNICATION SIGNAL USING OFDM SYMBOL ESTIMATION

(71) Applicant: ELECTRONICS AND TELECOMMUNICATIONS RESEARCH INSTITUTE, Daejeon (KR)

(72) Inventors: Hyung Jung Kim, Daejeon (KR); Chang-Joo Kim, Daejeon (KR); Jin Young Kim, Daejeon (KR); Seung-Ho Choi, Jeollanam-do (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 245 days.

(21) Appl. No.: 13/965,335

(22) Filed: Aug. 13, 2013

(65) Prior Publication Data

US 2014/0314165 A1    Oct. 23, 2014

(30) Foreign Application Priority Data

Apr. 17, 2013   (KR) .................. 10-2013-0042323

(51) Int. Cl.
*H04L 27/26* (2006.01)

(52) U.S. Cl.
CPC ........ *H04L 27/2678* (2013.01); *H04L 27/2666* (2013.01)

(58) Field of Classification Search
CPC . H04L 5/0007; H04L 27/261; H04L 27/2613; H04L 27/2678; H04L 27/2666
See application file for complete search history.

(56) References Cited

U.S. PATENT DOCUMENTS

2011/0292927 A1* 12/2011 Lee .................... H04L 27/2657
                                                          370/350

FOREIGN PATENT DOCUMENTS

| KR | 1020060073257 A | 6/2006 |
| KR | 1020110130338 A | 12/2011 |
| KR | 1020120048362 A | 5/2012 |

OTHER PUBLICATIONS

Sachin Chaudhari, et al; "Collaborative Autocorrelation-Based Spectrum Sensing of OFDM signals in Cognitive Radios", 42nd Annual Conference on Information Sciences and Systems, pp. 191-196, Mar. 19-21, 2008.
Arunkumar Jayaprakasam, et al; "Cyclic Prefix Based Cooperative Sequential Spectrum Sensing Algorithms for OFDM", Proceeding of ICC 2010, pp. 1-6, May 23-27, 2010.

* cited by examiner

*Primary Examiner* — Daniel Washburn
*Assistant Examiner* — Eboni Hughes
(74) *Attorney, Agent, or Firm* — Ladas & Parry LLP (57) ABSTRACT

A method provides an identifying OFDM communication signal using OFDM symbol estimation. In view of the above, the present invention provides an apparatus and method for identifying an OFDM communication signal using an OFDM symbol estimation, which is capable of analyzing the OFDM signal with a high accuracy in a cognitive radio technique, thereby identifying the OFDM signal from a heterogeneous communication signal.

10 Claims, 10 Drawing Sheets

METHOD FOR IDENTIFYING OFDM COMMUNICATION SIGNAL USING OFDM SYMBOL ESTIMATION

RELATED APPLICATIONS

This application claims the benefit of Korean Patent Application No. 10-2013-0042323, filed on Apr. 17, 2013, which is hereby incorporated by reference as if fully set forth herein.

FIELD OF THE INVENTION

The present invention relates to a method for identifying an OFDM communication signal using OFDM symbol estimation, and more particularly, the present invention relates to a method for identifying an OFDM signal from heterogeneous communication signals.

BACKGROUND OF THE INVENTION

In recent years, along with a sudden spread of smart terminals, a broadband high-speed communication scheme such as LTE (Long Term Evolution) and WIBRO (Wireless Broadband) has been adopted as standard, and an environment to detect an OFDM communication system using a cognitive radio technique happens to be the trend.

In general, how to identify the signals in an OFDM system is achieved by a method for estimating a frequency offset. In connection with the method for estimating a frequency offset, Korean laid-open Patent Application No. 2012-0048362, published on May 15, 2012, discloses a method to calculate the template and the correlation value of the sample of the pilot index located in the symbol and determine the frequency offset.

However, the method to identify the signals in the OFDM system is dependent on the presence of CP (Cyclic Prefix); and therefore there occurs a deviation in magnitude and position of peak value when the pilot signal exists. Further, In addition, the cycle analysis used to interpret the OFDM signal exhibits behavior that significantly changes in the cyclic frequencies depending on the size that the input signal is divided into frames.

SUMMARY OF THE INVENTION

In view of the above, an embodiment of the present invention provides an apparatus and method for identifying an OFDM communication signal using an OFDM symbol estimation, which is capable of analyzing the OFDM signal with a high accuracy in a cognitive radio technique, thereby identifying the OFDM signal from a heterogeneous communication signal.

However, the object of the embodiment of the present invention will not be limited to the above, and another object, which has not been described, may be presented.

In accordance with an exemplary embodiment of the present invention, there is provided a method for identifying an OFDM communication signal in an OFDM system using the estimation of an OFDM symbol, which includes: assuming an NFFT, in the OFDM communication signal where at least one CP (Cyclic Prefix) is arranged at an interval of the NFFT which is a length of an FFT symbol, to be nfft which is a value in a set of possible numbers; estimating an NPREFIX, which is a length of the CP, with respect to the assumed nfft and setting the estimated NPREFIX to be an e_prefix(nfft); measuring a confidence of the e_prefix(nfft); performing said setting operation and said measuring operation with respect to all nffts in the set of possible numbers inclusive of the NFFT; selecting an e_prefix(nfft) having the highest confidence and an nfft having the highest e_prefix(nfft) in accordance with a result of said performing operation; and estimating the selected e_prefix(nfft) and the nfft to be the length of the CP and the length of the FFT, respectively, and identifying the kind of the OFDM communication signal based on the estimated lengths of the CP and FFT.

In accordance with any one of the embodiment of the present invention, it is possible to identify the presence of the OFDM signal through the cognitive radio technique even in the heterogeneous communication system; and therefore, the accuracy and validity of the periodicity analysis can be improved accordingly.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

Hereinafter, the embodiments of the present invention will be described in detail with reference to the accompanying drawings so that they can be readily implemented by those skilled in the art. However, the present invention may be embodied in different forms, but it is not limited thereto. In the drawings, further, portions unrelated to the description of the present invention will be omitted for clarity of the description and like reference numerals and like components refer to like elements throughout the detailed description.

In the entire specification, when a portion is "connected" to another portion, it means that the portions are not only "connected directly" with each other, but they are "electrically connected" with each other by way of another element therebetween. Further, when a portion "comprises" a component, it means that the portion does not exclude another component but further comprises other component unless otherwise described. Furthermore, it should be understood that one or more other features or numerals, steps, operations, components, parts or combinations thereof are not excluded beforehand in a possibility of their presence or addition.

Hereinafter, the embodiments of the present invention will be described in detail with reference to the accompanying drawings.

Figure 1:
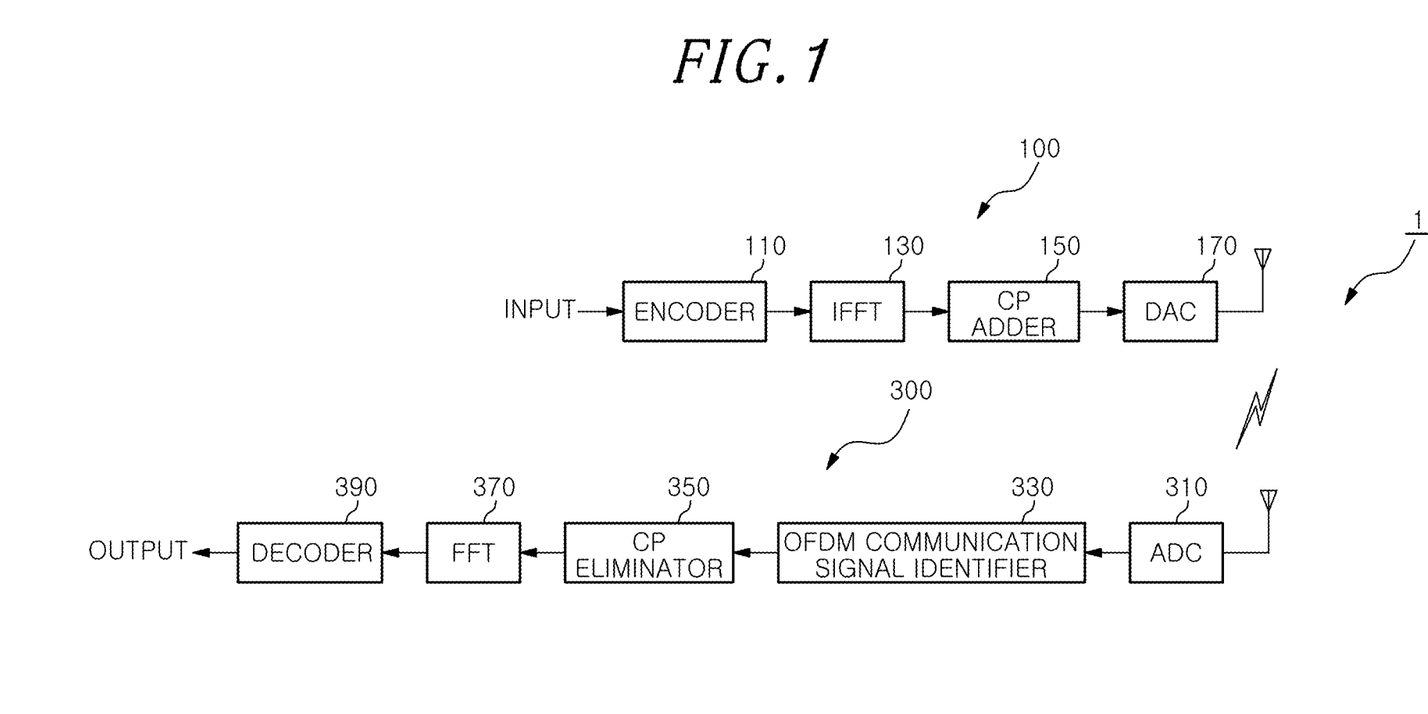
FIG. 1 is a block diagram illustrating an OFDM system in accordance with an embodiment of the present invention.

FIG. 1 is a block diagram illustrating an OFDM system in accordance with an embodiment of the present invention. Referring to FIG. 1, an OFDM system 1 in accordance with an exemplary embodiment of the present invention includes an OFDM transmitter 100 and an OFDM receiver 300. The OFDM transmitter 100 includes an encoder 110, an IFFT (Inverse Fast Fourier Transform) 130, a CP (Cyclic Prefix) adder 150, a DAC (Digital to Analog Converter) 170. The OFDM receiver 300 includes an ADC (Analog to Digital Converter) 310, an OFDM communication signal identifier 330, a CP eliminator 350, and an FFT (Fast Fourier Transform) 370.

However, the OFDM system 1 shown in FIG. 1 is merely an exemplary embodiment of the present invention; and, therefore, it is understood that the embodiment of the present invention is not limited to the system shown in FIG. 1. The OFDM system 1 of the embodiment of the present invention may be any other type of OFDM system if it additionally includes the OFDM communication signal identifier 330 between the ADC 310 and the CP eliminator 350. In other words, when the OFDM communication signal identifier 330 is arranged between the ADC 310 and the CP eliminator 350 in the OFDM receiver 300, irrespective of whether an existing OFDM system has any other type of system, any other form of OFDM system may be employed in the embodiment of the present invention.

The OFDM system having the above described configuration will be explained in detail as follows.

First, an input bit stream destined for transmission may be input through the encoder 110. The encoder 110 encodes the input bit stream in a predetermined manner and outputs the encoded bit stream to a serial-to-parallel converter (not shown) which converts it into a parallel bit stream. The conversion of the encoded bit stream into the parallel bit stream by the serial-to-parallel converter is for the purpose of performing an inverse FFT. Subsequently, the parallel bit stream from the serial-to-parallel converter is then sent to the IFFT 130. In this regard, it may be assumed that the parallel bit stream is comprised of the N number of symbols. The reason why the number of symbols is N is that the IFFT 130 performs the inverse FFT on input bit streams in a unit of N-number symbols.

Accordingly, the IFFT 130 receives the N number of symbols in parallel and performs the inverse FFT on the symbols to be transmitted, thereby converting the symbols in a frequency domain into symbols in a time domain. The symbols converted into the time domain may be input to a parallel-to-serial converter (not shown), which converts the N number of symbols in the time domain received in parallel into in serial, i.e., a sequence of N number of bit streams.

The CP adder 150 copies a predetermined number of bits inversely from a last bit in the N number of bit streams and additionally inserts the copied bits in between OFDM symbols. Such addition of the CP that is the copied bits may be for eliminating an effect on a multi-path channel. The OFDM symbols to which the CP is additionally inserted is transferred to the DAC 170, which converts the OFDM symbols in digital into OFDM symbols in analog and transmits the same to the OFDM receiver 300.

On the other hand, in the OFDM receiver 300, the ADC 310 converts an OFDM signal in analog received via a communication channel into an OFDM signal in digital, the OFDM communication signal identifier 330 estimates a length of FFT and a length of the CP in the OFDM communication signal to estimate a length of an OFDM symbol. In this case, when heterogeneous communication systems are mixed, the OFDM communication signal identifier 330 detects whether there exists an OFDM signal. When it is detected that there exist the OFDM communication signal, the OFDM communication signal identifier 330 estimates the length of the OFDM symbols by estimating the length of the FFT and CP. Accordingly, the OFDM communication signal identifier 330 may be configured to discriminate that a communication signal in question has any type of communication scheme.

The OFDM communication signal identifier 330 in accordance with an embodiment of the present invention is contributed from the facts that an energy-based detection method is difficult to use when detecting an OFDM communication scheme in a cognitive radio and that a matching filter-based correlation method is also impossible to use owing to an awareness of preamble information of an unknown OFDM communication signal when identifying the unknown OFDM communication signal.

Further, conventional methods utilized to detect an OFDM communication signal are based on the existence of a CP in the OFDM communication signal or use a cyclostationary property due to pilot signals; however, in the latter, the presence of the pilot signals may cause a deviation in the magnitude and position of a peak value. Further, a cyclic analysis (cyclic autocorrelation function or cyclic frequency) used to interpret the OFDM signal exhibits a property that the cyclic frequency is significantly changed on the ground of the process of dividing an input signal into frames.

Thus, the OFDM communication signal identifier 330 in accordance with an embodiment of the present invention estimates the length of the FFT and CP of the OFDM communication signal in order to figure out the length of the OFDM symbol for the purpose of the cycle analysis. Accordingly, since the OFDM communication signal identifier 330 is applied to the cognitive radio system, the OFDM communication signal can be identified, and even the specification of the OFDM communication signal can be perceived even in a state where heterogeneous communication signals are mixed.

Referring continued to FIG. 1, the CP eliminator 350 eliminates CPs affected by the multi-path channel. The OFDM signal from which CP is eliminated has a signal in serial, and thus, may be converted into a signal in parallel, in a unit of N-number, by a serial-to-parallel converter (not shown) so that they are subjected to the inverse FFT. The reason is that the inverse FFT has been performed by the OFDM transmitter 100 in a unit of N-number. Therefore, the FFT 370 receives data in parallel, in a unit of N number, and performs the fast Fourier transform to convert the OFDM symbols in a time domain into OFDM symbols in a frequency domain on the received signal. The OFDM symbols converted into the frequency domain are converted into symbols in serial by a parallel-to-serial converter (not shown), and the decoder 390 decodes the symbol applied thereto to produce an output bit stream.

The OFDM system 1 in accordance with an embodiment of the present invention may estimate the length of FFT and the length of CP to estimate the length of the OFDM symbol and perceive the existence of the OFDM communication signal based on the length of the estimated the OFDM symbol and in turn even the specification of the OFDM communication signal. Further, the OFDM system 1 in accordance with an embodiment of the present invention may identify the OFDM communication signal even in a situation where heterogeneous communication systems are mixed and estimate precisely the length of the OFDM symbol so that FFT intervals can be divided accurately into frames, thereby increasing accuracy in communications.

Hereinafter, the configuration and operation of the OFDM communication signal identifier 330 in the OFDM system 1 will be described in detail.

Figure 2:
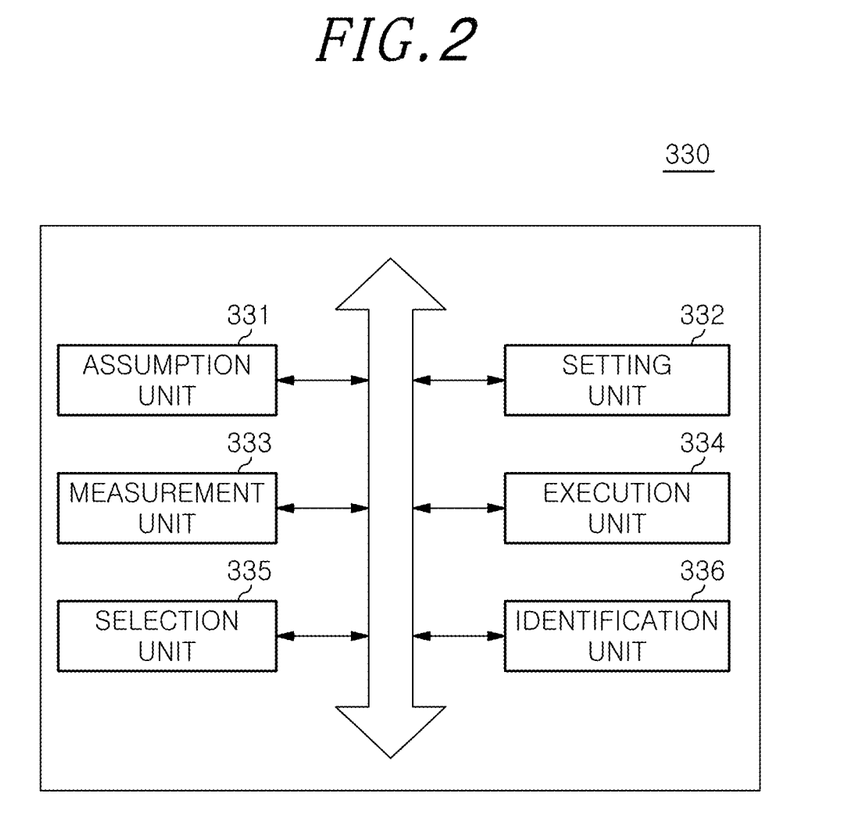
FIG. 2 is a detailed block diagram of the OFDM communication signal identifier shown in FIG. 1.
Figure 3:
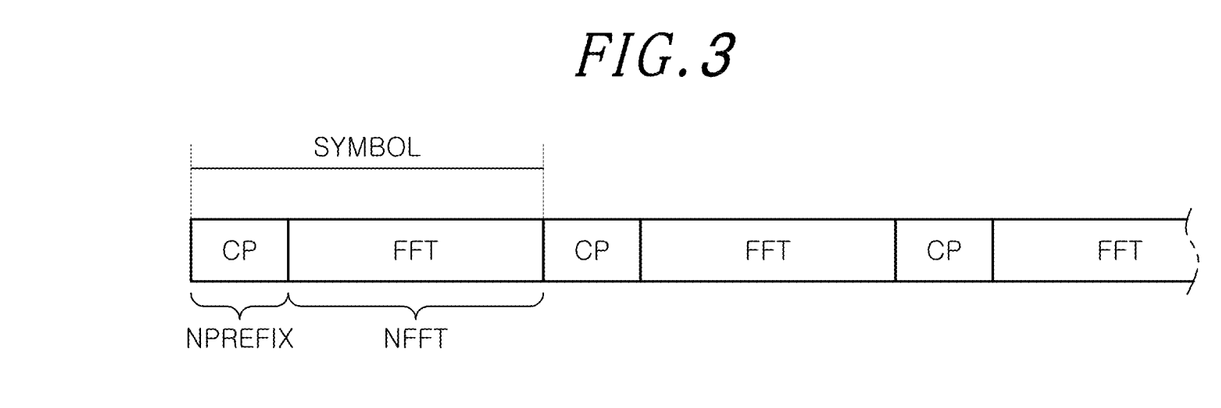
FIG. 3 is a diagram illustrating the concept of a symbol used in the OFDM communication signal identifier shown in FIG. 1.

FIG. 2 is a detailed block diagram of the OFDM communication signal identifier shown in FIG. 1, and FIG. 3 is a diagram illustrating the concept of a symbol used in the OFDM communication signal identifier.

Referring to FIG. 2, the OFDM communication signal identifier 330 includes an assumption unit 331, a setting unit 332, a measurement unit 333, an execution unit 334, a selection unit 335, and an identification unit 336.

The assumption unit 331 assumes an NFFT, in an OFDM communication signal where at least one CP is arranged in an interval of the NFFT which represents a length of an FFT symbol, to be an nfft which is a value in a set of possible numbers. The concept of an OFDM symbol will be described with reference to FIG. 3.

An OFDM communication signal used in the embodiment of the present invention is based on the assumption that the length of the FFT, i.e., the NFFT is represented to be $2^L$. If it does not assume that the NFFT is $2^L$, the amount of calculation may increase. Accordingly, it is assumed that the NFFT is expressed as a $2^L$.

The NFFT, which is commonly used, may be, for example, {64, 128, 256, 512, 1024, 2048}. Along with the assumption of the NFFT, it is also assumed that a length of CP exists between 5-15% of the numbers of NFFTs in the OFDM communication signal. FIG. 3 depicts the symbol satisfying these assumptions. Usually, the CP refers to a copy of a rear portion of a main symbol in line with the concept of the cyclic convolution; and therefore, the same signals as the CP can exist at intervals of NFFTs.

The setting unit 332 estimates NPREFIX, which represents the length of the CP, with respect to the assumed nfft and sets the estimated NPREFIX as e_nprefix(nfft), where 'e' denotes an abbreviation of a word 'estimation' and the e_nprefix(nfft) denotes the assumed length of the CP with respect to the assumed length of the FFT, nfft.

The measurement unit 333 measures confidence of the e_nprefix(nfft) which has been set as set forth above, and the execution unit 334 allows the setting unit 332 and the measurement unit 333 to execute with respect to all nffts in the set of possible numbers inclusive of the NFFT. The selection unit 335 selects e_nprefix(nfft) having the highest confidence and an nfft having the highest e_nprefix(nfft). The identification unit 336 estimates that the selected e_nprefix(nfft) and nfft become the length of the CP and the length of the FFT, respectively, and identifies the type of the OFDM communication signal on the basis of the estimated lengths of the CP and the FFT.

Following is a detailed description on the identification operation based on the configuration as set forth above.

Figure 4:
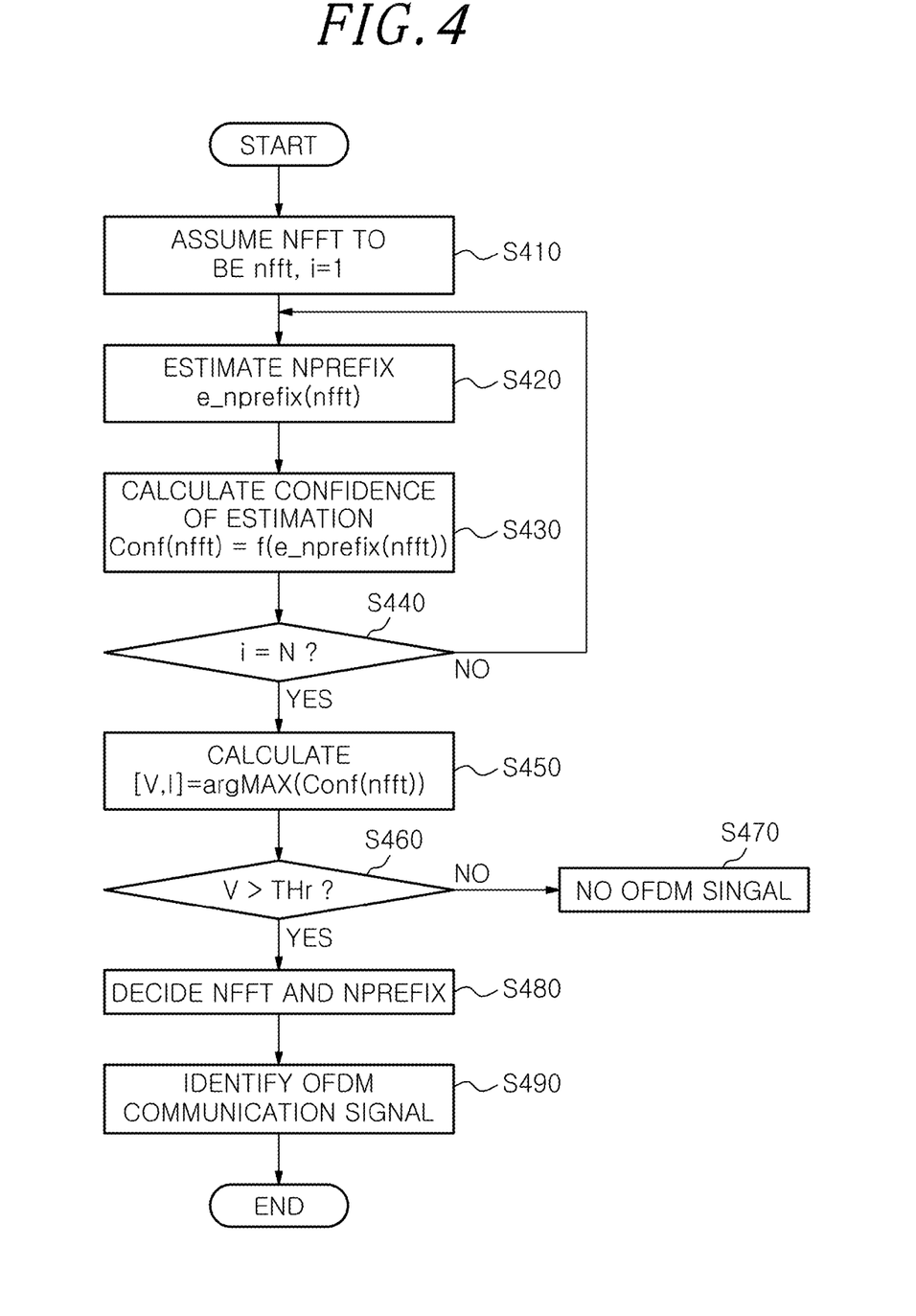
FIG. 4 is a flowchart illustrating a method for identifying the OFDM communication signal performed in the OFDM communication signal identifier shown in FIG. 1.
Figure 5:
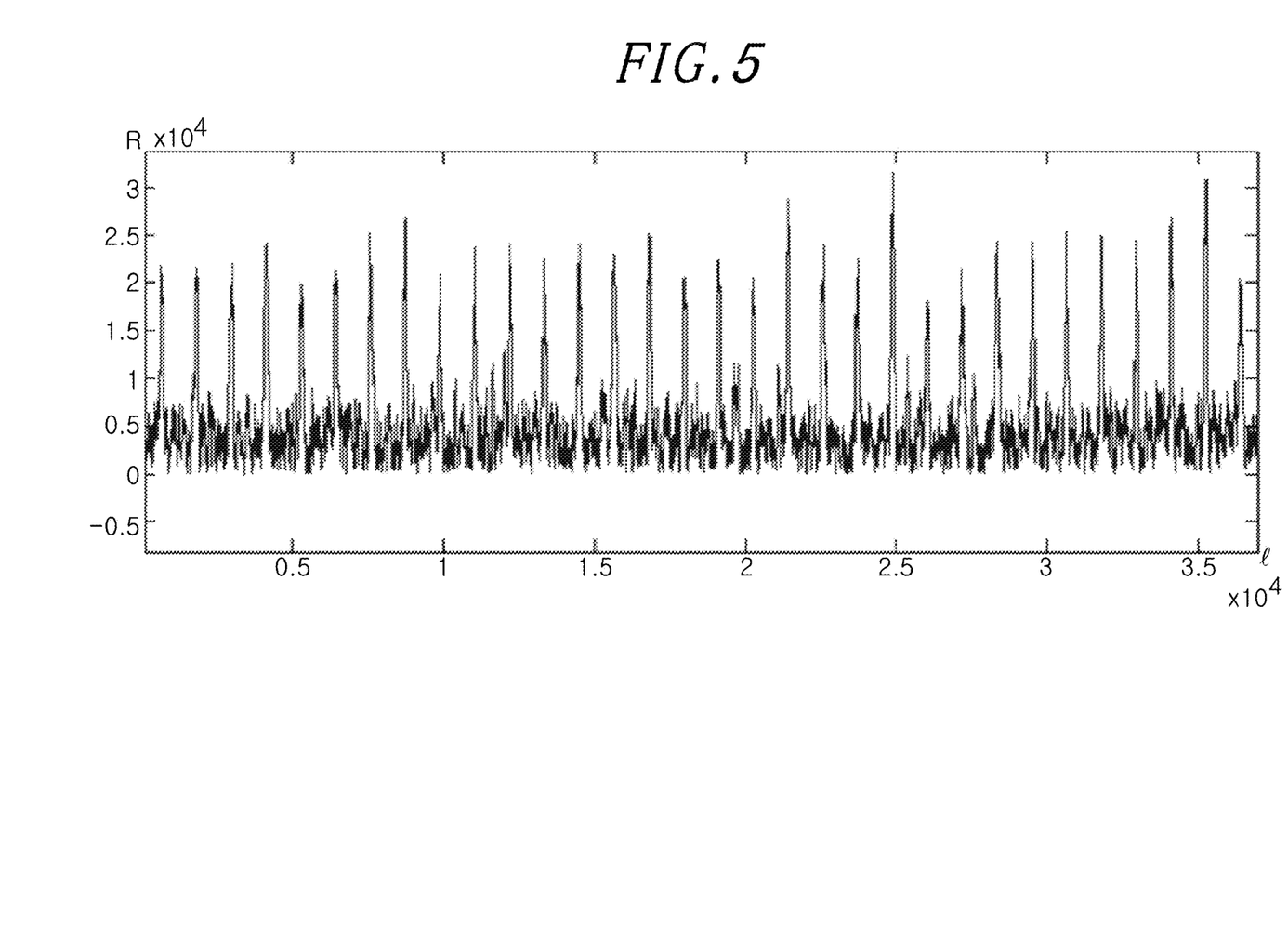
FIG. 5 depicts a two-dimensional graph illustrating the concept of determining the length of a CP using an autocorrelation function in the OFDM communication signal identifier shown in FIG. 1.
Figure 6:
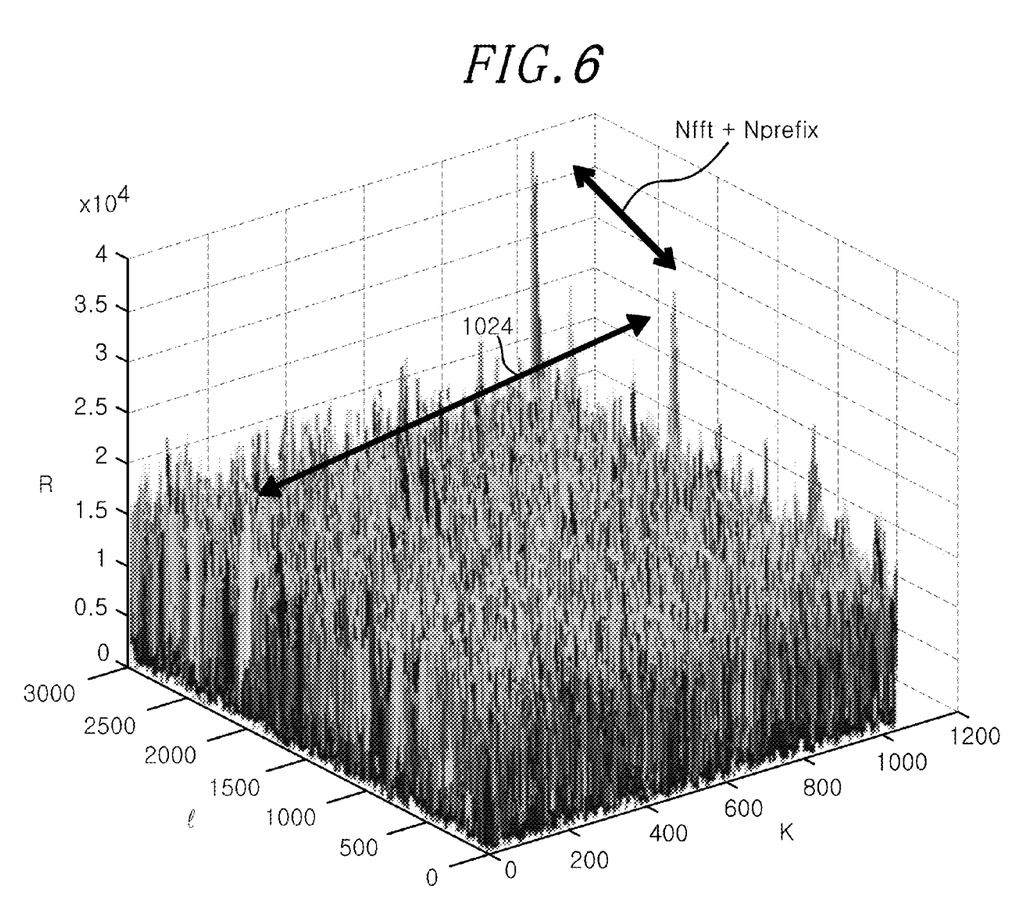
FIG. 6 depicts a three-dimensional graph illustrating the concept of determining the length of a CP using an autocorrelation function in the OFDM communication signal identifier shown in FIG. 1.
Figure 7:
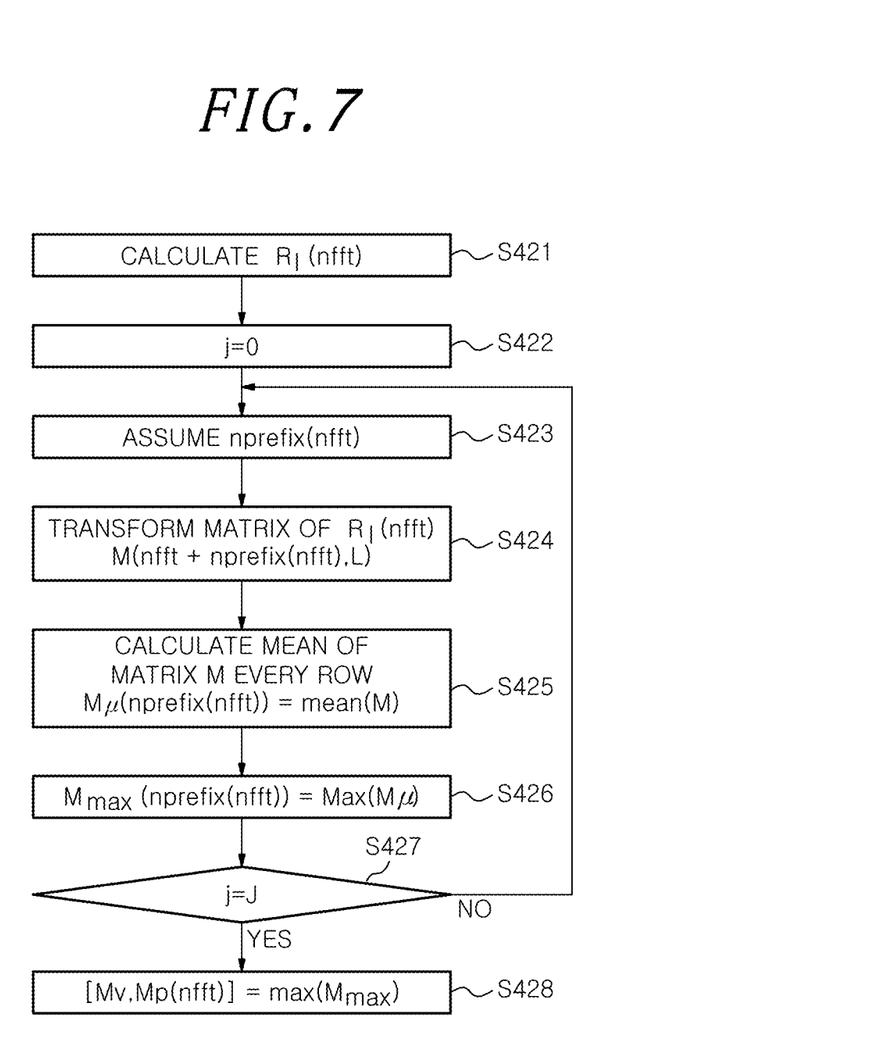
FIG. 7 is a flowchart illustrating in detail an operation S420 in the flowchart shown in FIG. 4.
Figure 8A:
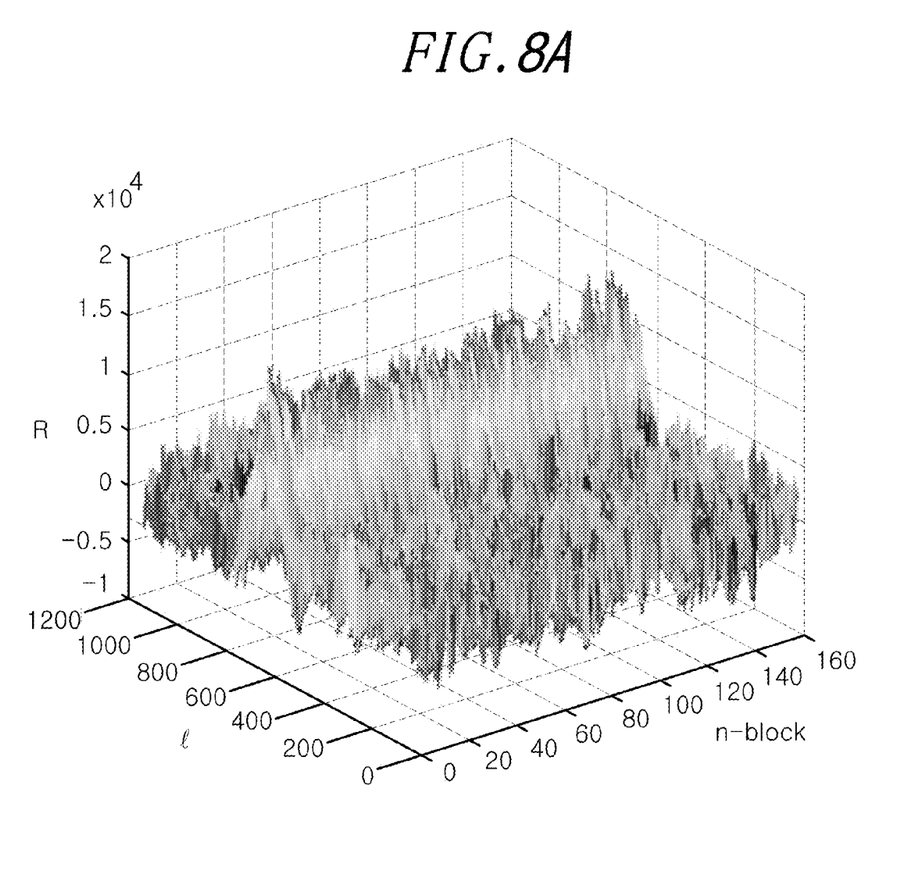
FIGS. 8A and 8B depict two-dimensional and three-dimensional graphs, respectively, illustrating the concept of determining the length of a CP using an autocorrelation function in the OFDM communication signal identifier shown in FIG. 1.
Figure 8B:
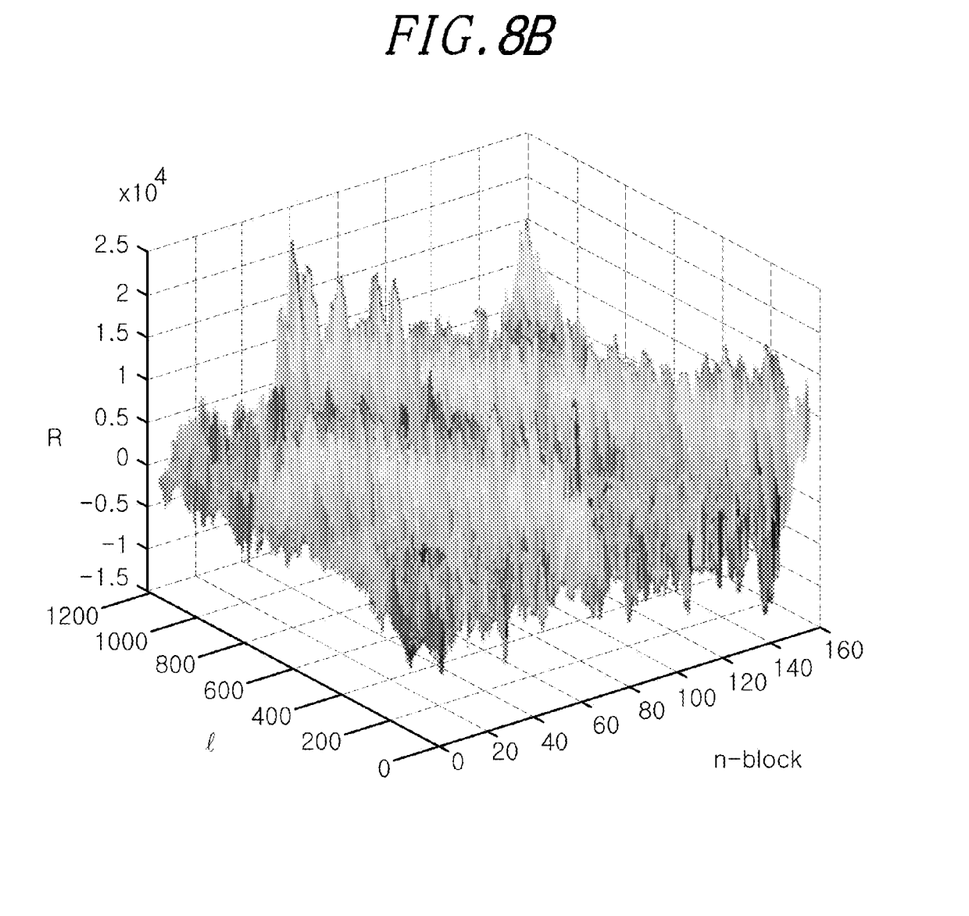
Figure 9:
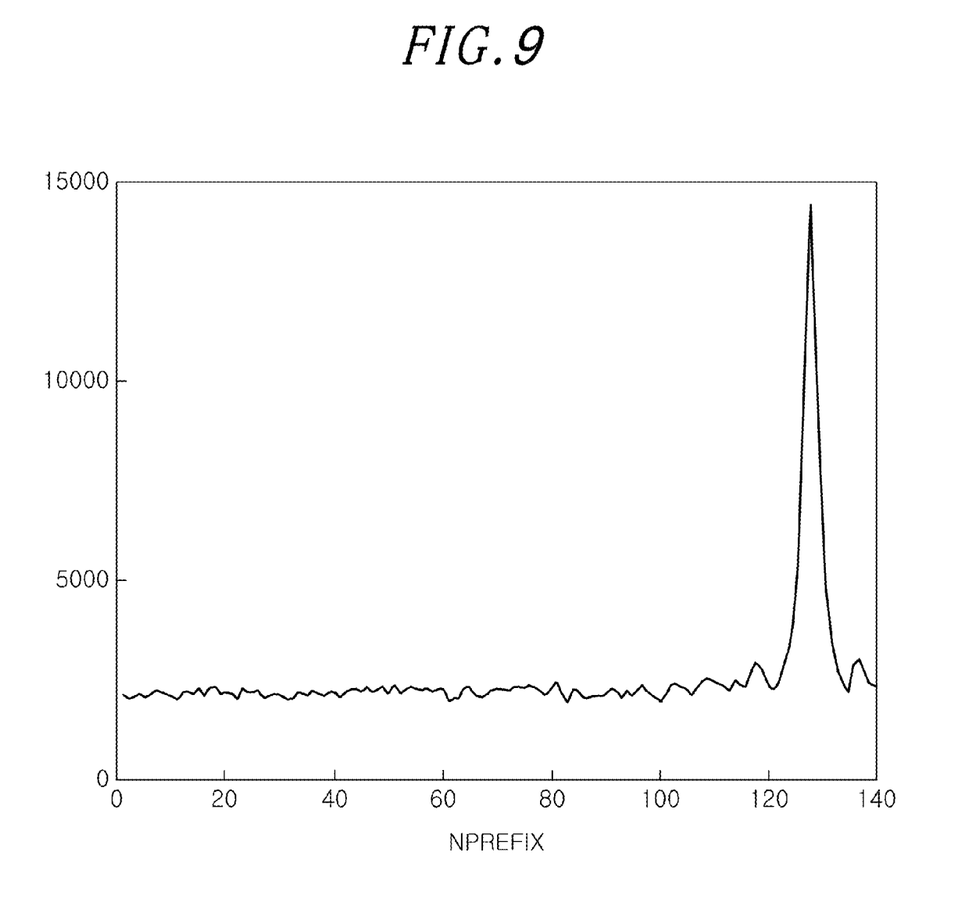
FIG. 9 plots a measured confidence of the estimated length of a CP in the OFDM communication signal identifier shown in FIG. 1.

FIG. 4 is a flowchart illustrating a method for identifying the OFDM communication signal performed in the OFDM communication signal identifier shown in FIG. 1, FIG. 5 depicts a two-dimensional graph illustrating the concept of determining the length of the CP using the autocorrelation function in the OFDM communication signal identifier shown in FIG. 1, FIG. 6 depicts a three-dimensional graph illustrating the concept of determining the length of the CP using the autocorrelation function in the OFDM communication signal identifier shown in FIG. 1, FIG. 7 is a flowchart illustrating in detail an operation S420 in the flowchart shown in FIG. 4, FIGS. 8A and 8B depict two-dimensional and three-dimensional graphs, respectively, illustrating the concept of determining the length of the CP using the autocorrelation function in the OFDM communication signal identifier shown in FIG. 1, and FIG. 9 plots a measured reliability of the estimated length of the CP in the OFDM communication signal identifier shown in FIG. 1.

Referring to FIG. 4, the OFDM communication signal identifier 330 assumes that an NFFT is an nfft which is a value in a set of possible numbers, in operation S410. Further, the OFDM communication signal identifier 330 estimates an NPREFIX which is the length of the CP with respect to the assumed nfft and assumes that the estimated NPREFIX is an e_nprefix(nfft), in operation S420.

Subsequently, the OFDM communication signal identifier 330 calculates confidence of the estimated e_nprefix(nfft), in operation S430. The OFDM communication signal identifier 330 repeats the above described procedures on all 'N' to be estimated, in operation S440, and uses an argMax function to select an e_nprefix(nfft) having the highest confidence and a nfft having the highest e_nprefix(nfft), in operation S450, wherein N represents the number of elements in the NFFT set and argMAX function denotes a function that selects the maximum value among values and outputs the location of the value indicative of the maximum value. Next, it is determined whether the confidence exceeds a predetermined threshold, in operation S460. When it is determined that the confidence does not exceed the predetermined threshold, the OFDM communication signal identifier 330 determines that there is no OFDM communication signal, in operation S470.

It is because that when the OFDM communication signal identifier 330 finds properly values of the NFFT and the NPREFIX, that is, if the OFDM communication signal exists, the maximum value of the confidence exceeds the predetermined threshold, and when the OFDM communication signal does not exist, the maximum value of the confidence does not exceed the predetermined threshold. Thus, the OFDM communication signal identifier 330 determines that the OFDM communication signal exists when the maximum value of the confidence should be greater than or equal to the predetermined threshold and that the OFDM communication signal does not exist when the maximum value of the confidence is less than the predetermined threshold.

Further, in the case where it is determined that the OFDM communication signal exists because the maximum value of the confidence is greater than or equal to the predetermined threshold, the OFDM communication signal identifier 330 determines the NFFT and NPREFIX, in operation S480, and then identifies the OFDM communication signal, in operation S490.

Among the above operations, it is noted that the most critical operation is the operation S420. That is, this operation is how to effectively estimate the NPREFIX with respect to the values of the NFFT under consideration. For the purpose of the estimation of the NPREFIX, the OFDM communication signal identifier 330 in accordance with an embodiment of the present invention defines a BMOC (Block Based Modified Cross-Correlation) as expressed in Equation 1.

$$R_l(k) = \sum_{n=0}^{M} x(l+n)y(l+n+k) \qquad \text{Eq. 1}$$

where $R_l(k)$ denotes a cross-correlation, $x(n)$ and $y(n)$ denote arbitrary two signals, l means a time, M denotes a length of a block in which a cross-correlation is calculated, and k represents the time difference between $x(n)$ and $y(n)$. While a lot of multiplication operations are needed to calculate the BMCC, the amount of computational loads can be significantly reduced because Equation 1 can be repeatedly calculated depending on the progress in time. Following Equation 2 shows a result of inducing the repeated expression.

$$R_{l+1}(k) = \qquad \text{Eq. 2}$$
$$\sum_{n=0}^{M} x(l+1+n)y(l+1+n+k) = \sum_{n=0}^{M-1} x(l+1+n)y(l+1+n+k) +$$
$$x(l+1+M)y(l+1+M+k) + [x(l)y(l+k) - x(l)y(l+k)] =$$
$$\sum_{n=1}^{M} x(l+n)y(l+n+k) + x(l+1+M)y(l+1+M+k) +$$
$$[x(l)y(l+k) - x(l)y(l+k)] = \sum_{n=0}^{M} x(l+n)y(l+n+k) +$$
$$x(l+1+M)y(l+1+M+k) - x(l)y(l+k) =$$
$$R_l(k) + x(l+1+M)y(l+1+M+k) - x(l)y(l+k)$$

where $x(n)$ and $y(n)$ denote arbitrary signals, l means a time, M denotes a length of a block in which a cross-correlation is calculated, and k represents the time difference between $x(n)$ and $y(n)$.

According to Equation 2, when $R_l(k)$ is known, $R_{l+1}(k)$ may be decided by performing a multiplication twice. If $x(n)$ and $y(n)$ are same with each other in the Equation 2, it may become a BMAC (Block Based Modified Autocorrelation). If it is assumed that nfft is known, the BMAC may be used to confirm the repetition of the CP.

That is, if it is assumed to be k=NFFT in $R_l(k)$, $R_l(NFFT)$ may exhibit a peak value every NPREFIX+NFFT=NSYMBOL. Referring to FIG. 5, there is shown $R_l(NFFT)$ of the OFDM signal when NFFT is 1024, NPREFIX is 128, and SNR is 0 dB. Of course, $R_l(k)$ may be calculated with respect to a variable k having different values, the result of which is illustrated in FIG. 6. Referring to FIG. 6, it can be known that the greatest peak appears when k is 1024. In this case, in order to decide the NPREFIX from $R_l(NFFT)$, it is needed to decide the NPREFIX having a high confidence through a statistical analysis for several peaks. This will be explained with reference to FIG. 7.

Referring to FIG. 7, a cross-correlation function $R_i(nfft)$ is calculated with respect to i-th nfft under consideration, in operation S421. Next, the above operation is repeated from j=0 until j becomes J, in operation S422.

First of all, a candidate CP is decided among one or more CPs, and a length of the candidate CP for the nfft is set as nprefix(nfft), in operation S423; and a one-dimensional function $R_i(nfft)$ is transformed into a two-dimensional matrix using a following Equation 3, in operation S424. However, as in the example in FIG. 5, on the assumption that a peak value has nfft_nprefix(nfft) repeatedly, a following Equation may be performed.

$$M(nfft+nprefix(nfft),L)=\text{reshape}(R_i(nfft),[nfft+nprefix(nfft),L] \qquad \text{Eq. 3}$$

where reshape(A,B) is a function that transforms a magnitude A to that of B, M means a matrix in which $R_i(nfft)$ is segmented in a unit of a length nfft+nprefix(nfft) and arranged in a row, and L denotes a quotient obtained by dividing $R_i(nfft)$ by nfft+nprefix(nfft). In this connection, FIG. 8A illustrates a case where nfft and nprefix(nfft) are true values while FIG. 8B illustrates a case where the nfft has a true value, but nprefix(nfft) has an error value.

Next, a mean vector in a row direction is calculated on a basis of a matrix M by using a following Equation 4, in operation S425.

$$M\mu(nprefix(nfft))=\text{mean}(M)M \qquad \text{Eq. 4}$$

where $M\mu$ represents a mean vector for nfft and nprefix(nfft), and mean(M) represents a function used to obtain a mean for a matrix M.

Subsequently, a maximum value is calculated on a basis of the mean vector using a following Equation 5.

$$M_{max}(nprefix(nfft))=\text{Max}(M\mu) \qquad \text{Eq. 5}$$

where $M_{max}(nprefix(nfft))$ represents strength when a length of a candidate CP is nprefix(nfft) and Max($M\mu$) means a function to calculate a maximum value of $M\mu$. This operation will be repeated until j becomes J, in operation 5427. Thereafter, the e_nprefix(nfft) may be decided by a following Equation 6.

$$[Mv,Mp(nfft)]=\max(M_{max}) \qquad \text{Eq. 6}$$

where max($M_{max}$) represents a function that yields a maximum value Mv in $M_{max}$ and a location, Mp(nfft), where the maximum value Mv is obtained; and the location Mp(nfft), where the maximum value Mv is obtained, represents the length of the candidate CP. Referring to FIG. 9, there is illustrated an embodiment of the function $M_{max}$.

It can be seen from FIG. 9 that there exists a large peak. The existence of the large peak may represent that a probability that Mp(nfft) about a given nfft is to be a true value becomes higher. Therefore, calculating the probability or confidence to be the true value ultimately may result in deciding NFFT and NPREFIX.

In other words, the confidence is given as a pair of one e_nprefix per nfft; and therefore, the confidence may be measured by applying the Z-score of Gauss's theorem based on the central limit theory to the maximum value Mv using a following Equation:

$$\text{Confidence}(nfft) = \frac{Mv - \mu_s}{\sigma_s} \qquad \text{Eq. 7}$$

where Confidence(nfft) means confidence for nfft, $\mu_s$ denotes a mean of signals in which values in the vicinity of a peak value is excluded from $M_{max}(k)$, and $\sigma_s$ denotes a standard deviation of signals with the exception of values in the vicinity of the peak value. In this case, as known from FIG. 9, when there exists a high peak, the estimated mean and standard deviation obtained from the $M_{max}$ function may be on the bias. Therefore, the method for identifying an OFDM communication signal derives the mean and standard deviation from the signals with the exception of values in the vicinity of the peak value from $M_{max}(k)$, thereby deciding the confidence.

In this case, an e_prefix(nfft) having the highest confidence that is greater than or equal to a predetermined threshold and the nfft having the e_prefix(nfft) with the highest confidence are selected. However, when the highest confidence is less than the predetermined threshold, it is determined that there is no OFDM communication signal not to select the nfft.

As a result, the length of the FFT and the length of the CP may be decide to be an nfft having the highest confidence and the e_prefix(nfft) with the nfft having the highest confidence, respectively.

In this regard, false alarm and detection rate may be determined by a threshold THr, which is normalized using the concept of a Z-score; and therefore, the false alarm is predicted roughly by integrating the values between the threshold THr and an infinity INf from the normal distribution having the average of '0' and the standard deviation of '1'. The following Table 1 is an example of this invention which verifies the method of identifying an OFDM communication signal in accordance with an exemplary embodiment of the present invention, wherein the confidence and NPREFIX are calculated under conditions that an NFFT is 1024, NPREFIX is 128, and SNR is 0 dB.

TABLE 1

| NFFT | NPREFIX | CONFIDENCE |
| --- | --- | --- |
| 64 | 13 | 1.2 |
| 128 | 19 | 3.1 |
| 256 | 9 | 2.2 |
| 512 | 59 | 3.0 |
| 1024 | 128 | 16.8 |
| 2048 | 151 | 3.1 |

The method for identifying an OFDM communication signal in accordance with an embodiment of the present invention can estimate the lengths of the FFT and the length of the CP which are the basic variables of the OFDM signal provided to an OFDM receiver, even in an unawareness of any information on the OFDM communication signal. At this point, when the estimated lengths of the FFT and the CP have an adequate reliability, the existence of the OFDM signal can be identified therefrom. Therefore, the present invention may be used as the method to detect the OFDM communication signal in a cognitive radio communication and obtain the length of the symbol through the estimated length of the FFT and CP, whereby the accuracy and validity of the periodicity analysis can be improved by appropriately framing the input signal received to the OFDM receiver. As a result, the method for identifying an OFDM communication signal in accordance with an embodiment of the present invention may provide significant clues to interpret the OFDM signal in the cognitive radio communication.

The description as set forth above is merely to illustrate the present invention, and it will be understood by those skilled in the art to which this invention belongs that various changes and modifications may be made without departing from the technical idea and the essential characteristics of the embodiments of the present invention. Therefore, it is understood that the exemplary embodiments disclosed herein are illustrative from every aspect and do not use to limit the present invention. For example, respective components described to be one body may be implemented separately from one another, and likewise components described separate from one another may be implemented in an integrated type.

Therefore, it should be construed that the scope of the present invention is defined by the appended claims rather than by the foregoing embodiments and meaning and scope of the claims and all changes and modifications that are derived from a concept of equivalents fall within the scope of the present invention.

What is claimed is:

1. A method for identifying an OFDM communication signal in an OFDM system using the estimation of an OFDM symbol, the method comprising:
assuming an NFFT, in the OFDM communication signal where at least one CP (Cyclic Prefix) is arranged at an interval of the NFFT which is a length of an FFT symbol, to be nfft which is a value in a set of possible numbers;
estimating an NPREFIX, which is a length of the CP, with respect to the assumed nfft and setting the estimated NPREFIX to be an e_prefix(nfft);
measuring a confidence of the e_prefix(nfft);
performing said estimating, said setting and said measuring with respect to all nffts in the set of possible numbers inclusive of the NFFT;
selecting an e_prefix(nfft) having the highest confidence and an nfft having the highest e_prefix(nfft) in accordance with a result of said performing operation; and
estimating the selected e_prefix(nfft) and the nfft to be the length of the CP and the length of the FFT, respectively, and identifying the kind of the OFDM communication signal based on the estimated lengths of the CP and FFT.

2. The method of claim 1, wherein in order to estimate the NPREFIX to set the estimated NPREFIX as the e_prefix (nfft), a BMCC (Block based Modified Cross-Correlation) function is defined as follows:

$$R_{l+1}(k)=R_l(k)+x(l+1+M)y(l+1+M+k)-x(l)y(l+k)$$

where x(n) and y(n) denote arbitrary signals, l means a time, M denotes a length of a block in which a cross-correlation is calculated, and k means the time difference between x(n) and y(n).

3. The method of claim 1, wherein said estimating an NPREFIX with respect to the assumed nfft and setting the estimated NPREFIX as an e_prefix(nfft) comprises:
calculating $R_l$(nfft) with respect to nfft under consideration.

4. The method of claim 3, wherein said estimating an NPREFIX with respect to the assumed nfft and setting the estimated NPREFIX as an e_prefix(nfft) comprises:
determining a candidate CP among the at least one CPs and setting a length of the candidate CP for the nfft as nprefix (nfft); and
transforming a one-dimensional function of the nprefix(n t), $R_l$(nfft), into a two-dimensional matrix using a following Equation:

$$M(nfft+nprefix(nfft),L)=\text{reshape}(R_l(nfft),[nfft+nprefix(nfft),L])$$

where reshape(A,B) is a function that transforms a magnitude A to that of B, M means a matrix in which $R_l$(nfft) is segmented in a unit of a length nfft+nprefix(nfft) and arranged in a row, and L denotes a quotient obtained by dividing $R_l$(nfft) by nfft+nprefix(nfft).

5. The method of claim 4, wherein said estimating an NPREFIX with respect to the assumed nfft and setting the estimated NPREFIX to be an e_prefix (nfft) comprises:
calculating a mean vector in a row direction on a basis of the matrix M using a following equation,
Mμ(nprefix(nfft))=mean(M) where Mp represents a mean vector for nfft and nprefix(nfft), and mean(M) represents a function used to obtain a mean for the matrix M.

6. The method of claim 5, wherein said estimating an NPREFIX with respect to the assumed nfft and setting the estimated NPREFIX as an e_prefix(nfft) comprises:

calculating the maximum value based on the mean vector using a following Equation, $$M_{max}(\text{nprefix}(\textit{nfft})) = \text{Max}(M\mu)$$

where $M_{max}$ (nprefix(nfft)) represents strength when a length of the candidate CP is nprefix(nfft), and Max($M\mu$) means a function to calculate a maximum value of $M\mu$.

7. The method of claim 6, wherein in said estimating an NPREFIX with respect to the assumed nfft and setting the estimated NPREFIX as an e_prefix(nfft),
the e_nprefix(nfft) is decided by using a following equation, $$[Mv, Mp(\textit{nfft})] = \max(M_{max})$$

where $\max(M_{max})$ represents a function that yields a maximum value Mv in $M_{max}$ and a location, Mp(nfft), where the maximum value Mv is obtained; and the location Mp(nfft) represents the length of the candidate CP.

8. The method of claim 7, wherein the confidence is given as a pair of one e_prefix (nfft) per nfft; and
wherein said measuring confidence of the e_prefix (nfft) comprises:
calculating the confidence by applying Z-score of Gaussian theorem, which is based on the central limit theory, to the maximum value Mv using a following Equation, $$\text{Confidence}(\textit{nfft}) = \frac{Mv - \mu_s}{\sigma_s}$$

where Confidence(nfft) means confidence for nfft, $\mu_s$ denotes a mean of signals in which values in the vicinity of a peak value is excluded from $M_{max}(k)$, and $\sigma_s$ denotes a standard deviation of signals with the exception of values in the vicinity of the peak value.

9. The method of claim 1, wherein said selecting an e_prefix(nfft) having the highest confidence and a nfft having the highest e_prefix(nfft) in accordance with a result of said performing operation comprise:
selecting an e_prefix(nfft) having highest confidence that is greater than or equal to a predetermined threshold and a nfft having the e_nprefix(nfft) having the highest confidence; and
determining that there is no OFDM communication signal when the highest confidence is less than the predetermined threshold not to select the nfft.

10. The method of claim 1, wherein the length of the FFT of the OFDM communication signal is expressed as $2^L$ which is exponential notation of 2.

* * * * *